(12) United States Patent
Artigue

(10) Patent No.: US 9,768,897 B2
(45) Date of Patent: Sep. 19, 2017

(54) METHOD FOR SEARCHING FOR A USEFUL SIGNAL IN A MULTIPLEXING BAND

(71) Applicant: SIGFOX, Labege (FR)

(72) Inventor: Cédric Artigue, Toulouse (FR)

(73) Assignee: SIGFOX, Labege (FR)

( * ) Notice: Subject to any disclaimer, the term of this patent is extended or adjusted under 35 U.S.C. 154(b) by 184 days.

(21) Appl. No.: 14/412,648

(22) PCT Filed: Jul. 5, 2013

(86) PCT No.: PCT/FR2013/051618
§ 371 (c)(1),
(2) Date: Jan. 2, 2015

(87) PCT Pub. No.: WO2014/006351
PCT Pub. Date: Jan. 9, 2014

(65) Prior Publication Data
US 2015/0155960 A1      Jun. 4, 2015

(30) Foreign Application Priority Data

Jul. 5, 2012   (FR) ..................... 12 56483

(51) Int. Cl.
*H04J 1/02*       (2006.01)
*H04B 7/26*       (2006.01)
(Continued)

(52) U.S. Cl.
CPC .............. *H04J 1/02* (2013.01); *H04B 7/2621* (2013.01); *H04B 17/336* (2015.01); *H04L 1/20* (2013.01); *H04J 1/12* (2013.01); *H04W 88/02* (2013.01)

(58) Field of Classification Search
CPC  . H04B 3/487; H04B 1/40; H04B 7/01; H04B 17/345; H04B 7/2621;
(Continued)

(56) References Cited

U.S. PATENT DOCUMENTS

2006/0133388 A1    6/2006  Wang et al.
2010/0246654 A1*   9/2010  Page ........................ H04B 7/01
                                                          375/224
(Continued)

FOREIGN PATENT DOCUMENTS

WO        2011154466 A1    12/2011

OTHER PUBLICATIONS

Ma et al., "Signal Processing in Cognitive Radio," Proceedings of the IEEE, vol. 97, No. 5, May 2009, pp. 805-823.

*Primary Examiner* — Michael Thier
*Assistant Examiner* — Prince A Mensah
(74) *Attorney, Agent, or Firm* — Seed IP Law Group LLP

(57) ABSTRACT

A method of searching for the presence of a useful signal of predefined spectral width ΔB in a multiplexing band having a spectral width greater than ΔB, includes calculating a frequency signal representative of a power spectral density in the multiplexing band, calculating a non-useful signal by filtering the frequency signal by means of a filter capable of suppressing all or part of signals having a spectral width equal to or smaller than ΔB, calculating a power ratio signal representative of the ratio of the frequency signal to the non-useful signal, and comparing the power ratio signal with a predefined threshold value. The method may be employed using a computer program product, a receiver unit, and/or a station of a digital telecommunications system comprising such a receiver unit.

8 Claims, 2 Drawing Sheets

(51) Int. Cl.
*H04B 17/336* (2015.01)
*H04L 1/20* (2006.01)
*H04J 1/12* (2006.01)
*H04W 88/02* (2009.01)

(58) Field of Classification Search
CPC .............. H04B 17/336; H04N 17/0055; H04L 27/2659; H04L 27/2675; H04L 1/20; H04J 1/02; H04J 1/12
See application file for complete search history.

(56) References Cited

U.S. PATENT DOCUMENTS

2011/0021167 A1\* 1/2011 Shellhammer ....... H04B 7/0837
455/226.1
2011/0026649 A1\* 2/2011 Lipka .................. H04L 27/2659
375/343
2012/0201286 A1\* 8/2012 Pons .................. H04B 17/0055
375/227

\* cited by examiner

METHOD FOR SEARCHING FOR A USEFUL SIGNAL IN A MULTIPLEXING BAND

BACKGROUND

The present disclosure relates to the field of digital telecommunications, and more specifically relates to the search for the presence of a useful signal of predefined spectral width ΔB in a shared frequency band having a spectral width larger than ΔB.

STATE OF THE ART

In digital telecommunications systems, it is known to use a same frequency band, called "multiplexing band", for transmissions of useful signals from terminals to a station.

Generally, the useful signals have the same spectral width, and said spectral width is known beforehand by the station. It is also possible, in certain cases, to have a plurality of possible spectral widths, all being known beforehand by the station.

Further, the central frequencies around which useful signals can be transmitted are, in the most general case, also predefined and known beforehand by the station. Thereby, the search for the presence of a useful signal transmitted in the multiplexing band may be limited to a power detection on each of the possible central frequencies.

There however exist cases where the central transmit frequencies of useful signals are not known in advance.

For example, the international PCT application published under number WO 2011/54466 describes a narrow band digital telecommunications system where spectral width ΔB of the useful signals is in the range from a few hertz to a few hundreds of hertz.

Further, to ensure a forced statistical frequency division multiple access (FSFDMA), the frequency drift of said useful signals is greater than spectral width ΔB.

It can thus be understood that in such a case, it is not possible to know in advance the central frequencies around which useful signals are likely to be received by the digital telecommunications system station. Thus, the search for the presence of a useful signal in the multiplexing band should be performed in the entire multiplexing band, and should accordingly be accompanied by a search for the central frequency (at least initial, if it varies along time) around which a useful signal is received by the station.

Such a joint presence and central frequency search may be complex to achieve, in particular if the multiplexing band is significantly larger than spectral width ΔB of the useful signals.

SUMMARY

An embodiment may facilitate overcoming all or part of the limitations of prior art solutions, particularly those discussed hereabove, by providing a solution which enables to search for the presence of a useful signal having a central frequency which is not known beforehand in a multiplexing band, in simple and robust fashion.

Further, this disclosure describes a solution which facilitates, at least in certain embodiments, to detect useful signals capable of being decoded with no errors.

In an embodiment, a method of searching for the presence of a useful signal in a general signal, said useful signal corresponding to a radioelectric signal having a predefined spectral width ΔB transmitted by a terminal in a multiplexing band having a spectral width greater than ΔB, the general signal corresponding to all the radioelectric signals received in the multiplexing band, comprises:

calculating a frequency signal representative of a power spectral density of the general signal sampled at elementary frequencies of the multiplexing band, calculating a signal, called "non-useful signal", by filtering the frequency signal by means of a filter capable of mainly suppressing all or part of signals having a spectral width equal to or smaller than ΔB in said frequency signal, calculating a signal, called "power ratio signal", representative of the ratio, at each elementary frequency, of the frequency signal to the non-useful signal, comparing the power ratio signal with a predefined threshold value, an elementary frequency for which said power ratio signal has a local maximum value greater than said threshold value being considered as being the central frequency of a useful signal present in the general signal.

Such a search method is relatively simple to implement, since it requires few operations after the frequency signal has been obtained. In particular, the filter used to calculate the non-useful signal may be a simple finite impulse response filter.

It should further be noted that the filter used to calculate the non-useful signal in an embodiment is a frequency filter, that is, it performs, in the frequency field, a linear combination of different samples of the frequency signal corresponding to different elementary frequencies.

In an embodiment, the application of this frequency filter introduces no other delay than that corresponding to the necessary calculation time of the convolution, and introduces a frequency shift which can easily be compensated for. Thus, the search method, by the use of a frequency filter, facilitates rapidly detecting useful signals in the general signal, while the use of a time filter, applied to samples obtained for different consecutive times, would necessarily introduce a delay depending on the order of said time filter.

In an embodiment, such a search method is further robust since it uses, to determine whether a useful signal is present in the general signal, a power ratio signal which is representative of the signal-to-noise/interference ratio that a useful signal would have at each elementary frequency.

Indeed, the non-useful signal is representative, at each elementary frequency, of the power received on this elementary frequency, the signals of spectral width equal to or smaller than ΔB (and accordingly all the useful signals possibly present in the general signal) having been previously suppressed.

The frequency signal is representative, at each elementary frequency, of the entire power received on this elementary frequency, which corresponds to the power of the non-useful signal on this elementary frequency, possibly cumulated with the power of a useful signal present on this elementary frequency.

In specific embodiments, the search method may comprise one or a plurality of the following features, taken separately or according to all technically-possible combinations.

In an embodiment, where the elementary frequencies are separated by a sampling interval Δb smaller than ΔB, the method comprises calculating a signal, called "averaged signal", by averaging the frequency signal with a sliding window on the elementary frequencies, the sliding window having a width substantially equal to ΔB. In this case, the non-useful signal is calculated by filtering the averaged signal, and the power ratio signal is calculated as being representative of the ratio, at each elementary frequency, of the averaged signal to the non-useful signal.

Due to this averaging, the power, in each band substantially of spectral width ΔB, is concentrated around the elementary frequency substantially located at the center of the band substantially of bandwidth ΔB. In an embodiment, the detection of useful signals is improved, in particularly due to the fact that, in the presence of a useful signal, the averaged signal will have a local maximum value at the level of the elementary frequency closest to the real central frequency of said useful signal, while this is not necessarily true in the frequency signal.

Further, it is advantageous to consider a sampling interval Δb much smaller than ΔB (for example, smaller than ΔB4), particularly to improve the accuracy of the central frequencies of the useful signals. The power concentration is then all the more advantageous as the power of a useful signal is then distributed over a plurality of adjacent samples of the frequency signal.

In an embodiment, the threshold value is previously determined as being a value of the power ratio signal above which the probability to decode a useful signal with errors is lower than 5%, in an embodiment lower than 1%.

Probability of decoding a useful signal with errors means the probability of having, at the level of the physical layer, at least one false bit among the bits obtained after demodulation of the symbols (BPSK, DBPSK, QPSK, 16QAM, etc.) and after channel decoding if a channel coding has been performed by the terminal having transmitted the useful signal.

Such a threshold value selection for the power ratio signal may be advantageous in that it facilitates limiting the detection to useful signals capable of being decoded with no error with a high probability. Such a threshold value selection is possible due to the fact that the power ratio signal is representative of the signal-to-noise/interference ratio that a useful signal would have at each elementary frequency, so that an adapted threshold value can be previously defined, for example by simulation.

It should be noted that such a criterion of low probability of decoding a useful signal with errors is very different from a criterion of high probability of detection. Indeed, in an embodiment, only useful signals for which it is almost ensured to have an error-free decoding are detected. Thus, useful signals will not be detected if the probability of decoding them with errors is too high, whereby the detection probability may be lower.

Such an embodiment may be aimed at digital telecommunications systems which can tolerate a low-performance detection probability, for example due to the fact that a same useful signal is retransmitted a plurality of times by each terminal.

As a counterpart, such a search method facilitates optimizing the use of the calculation capacity of a station intended to decode useful signals, since said calculation capacity is mainly used for the processing of useful signals sufficiently powerful to be decoded.

In an embodiment, a computer program product comprises a set of program code instructions which, when they are executed by one or a plurality of processors, implement a method of searching for the presence of a useful signal in a general signal according to one or more of the methods disclosed herein.

In an embodiment, a unit for receiving a useful signal corresponding to a radioelectric signal of predefined spectral width ΔB transmitted by a terminal in a multiplexing band having a spectral width greater than ΔB, comprises circuitry configured to search for the presence of a useful signal in the multiplexing band in accordance with one or more of the methods disclosed herein.

In an embodiment, a station of a digital telecommunications system comprises a receiver unit as disclosed herein.

DESCRIPTION OF THE DRAWINGS

The disclosure will be better understood on reading of the following description, given as a non-limiting example, in relation with the drawings, which show.

In these drawings, identical references from one drawing to another designate identical or similar elements. For clarity, the shown elements are not to scale, unless otherwise mentioned.

DETAILED DISCUSSION OF EMBODIMENTS

Figure 1:
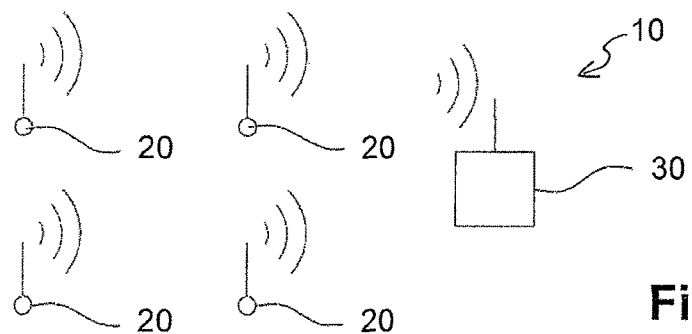
FIG. 1: a simplified representation of a digital telecommunications system.

FIG. 1 very schematically shows a telecommunications system 10 comprising a plurality of terminals 20 and a station 30.

Station generally means any receiver device capable of receiving radioelectric signals. Station 30 is for example any of terminals 20, or a specific device such as an access point of a wired or wireless telecommunications network, centralizing the data transmitted by each of said terminals 20.

Radioelectric signal means an electromagnetic wave propagating via wireless means, having frequencies in the conventional spectrum of radioelectric waves (from a few hertz to several hundreds of gigahertz) or in neighboring frequency bands.

It should be noted that the case of a data transmission from terminals 20 to station 30 is mainly considered. The possible transmission of data from station 30 to terminals 20 is not comprised within discussed herein.

Terminals 20 transmit useful signals to station 30 in a shared frequency band, called "multiplexing band", having a spectral width ΔM.

The useful signals transmitted by terminals 20 have a predefined spectral width ΔB smaller than ΔM. In an embodiment, spectral width ΔM of the multiplexing band is significantly greater than spectral width ΔB of the useful signals, to facilitate multiplexing a large number of terminals 20. For example, in an embodiment spectral width ΔM is at least one hundred times greater than spectral width ΔB.

Spectral widths ΔB and ΔM are both known beforehand by station 30. However, the central frequency around which a terminal 20 transmits a useful signal is not necessarily known beforehand by station 30. This is for example true, as previously indicated, when the frequency drift of the useful signals is greater than spectral width ΔB of said useful signals (see international application WO 2011/54466).

The following description considers, without this being a limitation, a digital telecommunications system such as described in international application WO 2011/54466, where the useful signals have a narrow band (spectral width ΔB in the range from a few hertz to a few hundreds of hertz) and the frequency drift of said useful signals is greater than spectral width ΔB.

It should further be noted that spectral width ΔB of the useful signals corresponds to the instantaneous spectral width of said useful signals. It should indeed be understood that the frequencies successively taken over time by a useful signal should correspond to a frequency band having a width greater than ΔB, particularly due to the frequency drift of said useful signal.

Accordingly, station 30 should search for the presence of useful signal in the entire multiplexing band, jointly with a search for the central frequencies of the useful signals present in said multiplexing band.

For this purpose, station 30 particularly comprises a receiver unit capable of receiving a general signal corresponding to all the radioelectric signals received in the multiplexing band.

The receiver unit comprises an analog receiver module and a digital receiver module.

The analog receiver module comprises circuitry and/or devices, considered as known by those skilled in the art (antennas, analog filters, amplifiers, local oscillators, mixers, etc.), capable of shifting the frequency of the general signal.

The analog receiver unit outputs an analog signal corresponding to the general signal shifted around an intermediate frequency lower than the central frequency of the multiplexing band, and which may be zero (in which case two analog signals are provided, corresponding in known fashion to the paths in phase I and in quadrature Q).

The digital receiver module comprises, in known fashion, one or a plurality of analog-to-digital converters (AD) capable of sampling the analog signal(s) delivered by the analog receiver module, with a predefined sampling period, to obtain a digital signal St representative of the analog signal(s).

The digital receiver module further comprises a unit for processing the digital signal at the output of the A/D converters. The processing unit particularly executes, based on the digital signal, a method 50 of searching for the presence of a useful signal in the general signal, described in further detail hereafter.

The processing unit for example comprises a processor and an electronic memory having a computer program product stored therein, in the form of a set of program code instructions which, when they are executed by the processor, implement all or part of the method 50 of searching for the presence of a useful signal. In an embodiment, the processing unit comprises programmable logic circuits, of FPGA, PLD, etc., type and/or application-specific integrated circuits (ASICs), capable of implementing all or part of said search method 50.

Figure 2:
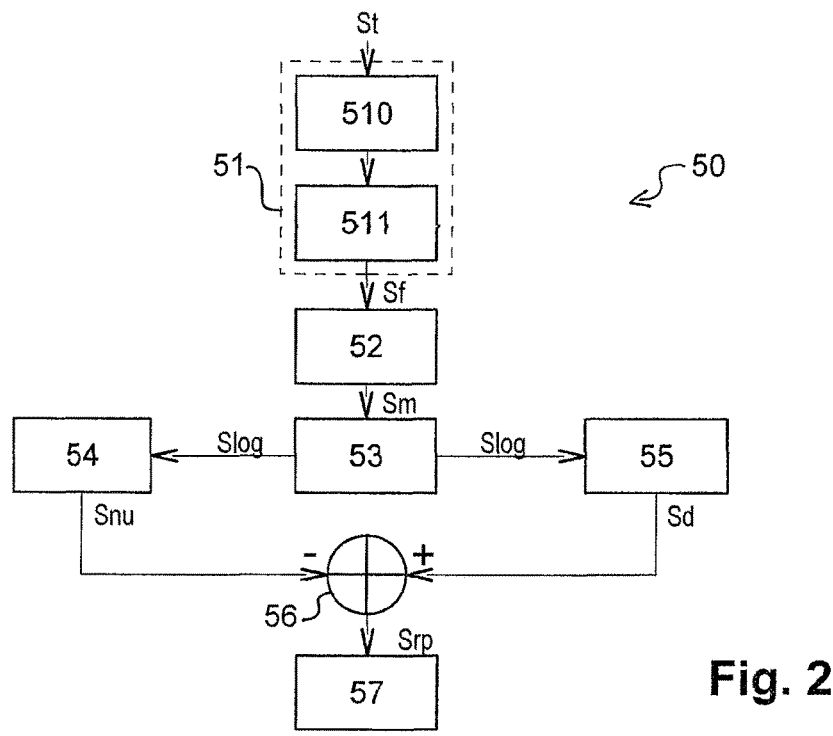
FIG. 2: a diagram illustrating an embodiment of a useful signal search method.

FIG. 2 shows an embodiment of a method 50 of searching for the presence of a useful signal transmitted by a terminal 20 in the multiplexing band, which comprises:

51 calculating a frequency signal Sf,
54 calculating a signal, called "non-useful signal" Snu,
56 calculating a signal, called "power ratio signal" Srp,
57 comparing power ratio signal Srp with a predefined threshold value.

In the embodiment illustrated in FIG. 2, search method 50 also comprises, in addition to the above acts, optional acts which will be described hereafter.

Frequency signal Sf calculated during calculation 51 is representative of a power spectral density of the general signal, said power spectral density being called "PSD" hereafter.

More particularly, frequency signal Sf is formed of N samples Sf(n) (0≤n≤N−1) representative of the values taken by power spectral density PSD of the general signal at elementary frequencies fn (0≤n≤N−1) regularly distributed in the multiplexing band with a sampling interval Δb assumed to be such that N·Δb=ΔM. In other words:

Sf={Sf(n), with 0≤n≤N−1},
Sf(n)~PSD(fn), "~" meaning "representative of",
fn=f0+n·Δb, with 0≤n≤N−1.

To accurately estimate the central frequency of a possible useful signal present in the general signal, sampling interval Δb is further selected to be smaller than spectral width ΔB of the useful signals. In some embodiments, sampling interval Δb is much smaller than spectral width ΔB, for example, smaller than ΔB4.

FIG. 2 shows an embodiment of act 51 of calculating frequency signal Sf. In this embodiment, act 51 of calculating frequency signal Sf comprises:

510 calculating a fast Fourier transform (FFT) of digital signal St, which is a signal defined in the time domain,
511 calculating frequency signal Sf as being the modulus, at each elementary frequency, of the result of the fast Fourier transform.

The power spectral density of digital signal St (representative of the general signal) is known to be obtained, at each elementary frequency, by calculating the square of the modulus of the result of the fast Fourier transform. Thus, frequency signal Sf may be linked to power spectral density PSD of the general signal by the following expression:

$$Sf(n) = \sqrt{PSD(fn)}$$

Figure 3A:
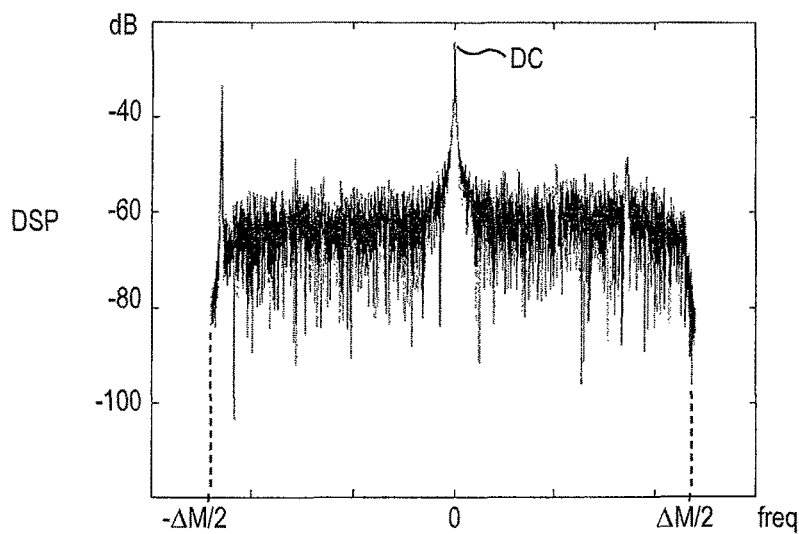
FIGS. 3a to 3d: examples of frequency signals obtained from the search method of FIG. 2.

FIG. 3a shows, in logarithmic scale, an example of power spectral density PSD of a general signal shifted to the baseband. In other words, FIG. 3a shows the variation of function 20·log(Sf(n)) for elementary frequencies distributed in a frequency interval [−Δ/M2; ΔM/2].

It should be noted that power spectral density PSD, in FIG. 3a, comprises a line centered on the zero frequency, which corresponds to an unwanted DC component, called "DC" in said FIG. 3a. It is indeed known by those skilled in the art that the zero frequency is generally very disturbed, whereby it is most often ignored in the search for the presence of useful signals due to the fact that:

the unwanted DC component risks leading to a false detection (that is, to erroneously considering that a useful signal, centered on the zero frequency, is present), even though a useful signal would be present and centered on the zero frequency, the probability of decoding it with no errors is low.

In the embodiment illustrated in FIG. 2, search method 50 comprises calculating at act 52 a signal, called "averaged signal" Sm. Averaged signal Sm calculated during act 52 is obtained by averaging of frequency signal Sf with a sliding window on elementary frequencies fn (0≤n≤N−1), said sliding window having a width substantially equal to spectral width ΔB of the useful signals.

This averaging of frequency signal Sf aims at concentrating the power, in each band substantially having a spectral width ΔB, around the elementary frequency substantially located at the center of the band substantially of frequency width ΔB. Thereby, in the presence of a useful signal, averaged signal Sm should theoretically comprise a local maximum value at the level of the elementary frequency closest to the real central frequency of said useful signal, while this is not necessarily true in frequency signal Sf.

Accordingly, averaged signal Sm is representative, at each elementary frequency, of the entire power received in a band of frequency width ΔB centered on this elementary frequency, which corresponds to the power of the non-useful signal in this band, possibly cumulated with the power of a useful signal present in this band.

In an embodiment, act 52 of calculating averaged signal Sm for example comprises calculating the following expression:

$$Sm(n) = \sum_{m=-M/2}^{M/2} h(m) \cdot Sf(n+m)$$

where:
h={h(m), with −M/2≤m≤M/2} is the sliding window used for the averaging, M being an even integer,
Sf(n+m)=Sf(n+m) if 0≤n+m≤N−1
Sf(n+m)=0 if n+m<0 or if n+m>N−1.

To have an averaging window of frequency width substantially equal to spectral width ΔB, M is for example selected to be such that (M−2)·Δb≤ΔB≤(M+2)Δb.

In a specific embodiment, the sliding window used is a simple rectangular window. In other words, h(m)=1/(M+1) with M/2≤m≤M/2. Nothing precludes, according to other examples, considering other types of sliding windows, possibly representative of weighted averages.

In the specific embodiment illustrated in FIG. 2, search method 50 comprises act 53 during which averaged signal Sm is converted to the logarithmic scale, by calculating a signal S log:

$$S\ log(n) = 20 \cdot \log(Sm(n)), \text{ with } 0 \le n \le N-1$$

Passing to a logarithmic scale is advantageous to enable to more simply calculate power ratio signal Srp.

Figure 3B:
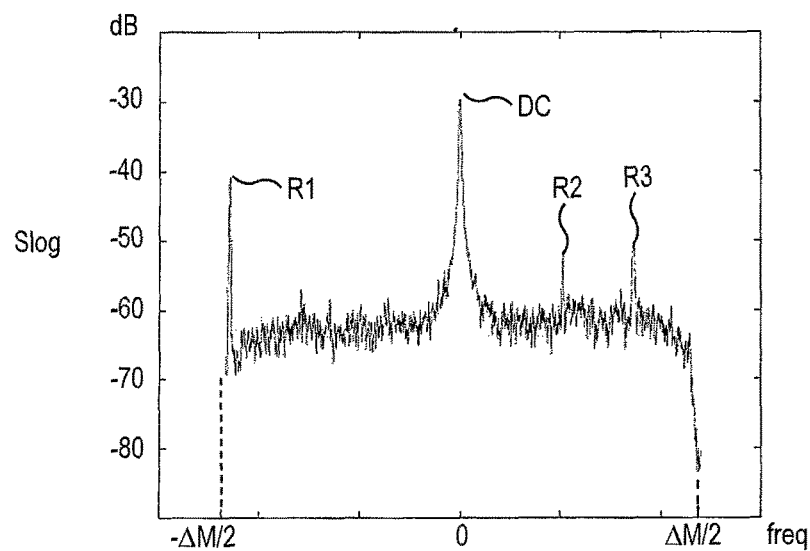

FIG. 3b shows a signal S log obtained from the signal illustrated in FIG. 3a. As illustrated in FIG. 3b, the averaging shows local maximum values R1, R2, R3 capable of corresponding to useful signals, by a concentration of the power of the useful signals around their central frequency, but also by a decrease in the fluctuations of a power spectral density of noise present in frequency signal Sf.

In a specific embodiment illustrated in FIG. 2, signal S log originating from averaged signal Sm and representative of power spectral density DSP of the general signal is then delivered to two different processing branches:

a first branch where non-useful signal Snu is calculated from signal S log (calculation act 54)

a second branch where a signal, called "shifted signal" Sd, is calculated 55 from signal S log.

In the first branch, non-useful signal Snu is calculated by filtering of signal S log using a filter capable of suppressing all or part of signals having a spectral width equal to or smaller than ΔB.

Thus, act 54 of calculating non-useful signal Snu performs a low-pass filtering of the frequency variations of signal S log in the multiplexing band. Indeed, the "fast" variations of signal S log, which correspond to signals which occupy a narrow frequency band, will be more attenuated than "slow" frequency variations of signal S log, which correspond to signals which occupy a wide frequency band.

The filter used during act 54 of calculating non-useful signal Snu is capable of strongly attenuating signals which occupy a frequency band equal to or smaller than ΔB, as compared with the signals occupying a frequency band greater than ΔB. The design of such a filter is considered as being within the abilities of those skilled in the art.

Due to the use of a filter having the above characteristics, it should be understood that, in the obtained non-useful signal Snu:

the useful signals possibly present in the general signal (and thus in signal S log) will be strongly attenuated, the noise, of substantially constant spectral density in the entire multiplexing band, will be lightly attenuated.

Accordingly, the filtering of signal S log enables to obtain a non-useful signal Snu representative, at each elementary frequency, of the power received in a band of frequency width ΔB centered on this elementary frequency, the signals of spectral width equal to or smaller than ΔB (and accordingly all the useful signals possibly present in the general signal) having been previously suppressed. Non-useful signal Snu is thus representative of noise/interference present in the multiplexing band.

Accordingly, the filtering of signal S log provides a non-useful signal Snu where the useful signals have been substantially suppressed.

Figure 3C:
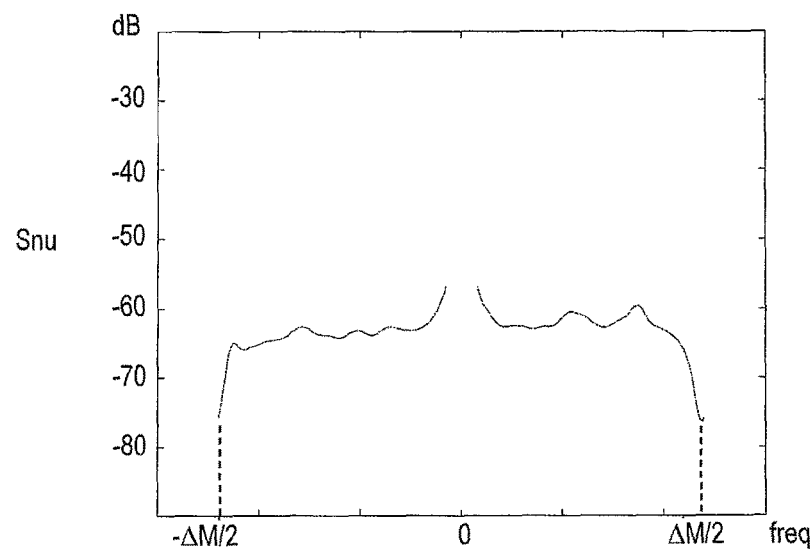

FIG. 3c shows a non-useful signal Snu obtained from signal S log illustrated in FIG. 3b. It can be observed that, due to the filtering, local maximum values R1, R2, and R3 have been strongly attenuated, while an average level of signal S log in the multiplexing band has been lightly attenuated.

In the second branch, search method 50 comprises act 55 during which signal S log, originating from the averaged signal, is frequency-shifted, to obtain a shifted signal Sd having its frequency realigned with non-useful signal Snu.

Indeed, non-useful signal Snu exhibits, in known fashion, a frequency shift which is introduced by the frequency filtering and which depends on the order of the implemented frequency filter. The determination of the introduced frequency shift and its compensation may be performed in a simple manner, by operations considered as being within the abilities of those skilled in the art.

Useful signal search method 50 then comprises act 56 of calculating power ratio signal Srp, said power ratio signal being representative, at each elementary frequency, of a ratio of the averaged signal Sm obtained for this elementary frequency to the non-useful signal Snu obtained for this elementary frequency.

In the example illustrated in FIG. 2, the power ratio signal Srp is calculated from non-useful signal Snu and shifted signal Sd, which essentially corresponds to averaged signal Sm.

Due to the fact that non-useful signal Snu and shifted signal Sd are both in logarithmic scale, power ratio signal Srp is calculated by simply subtraction, at each elementary frequency, of non-useful signal Snu from shifted signal Sd:

$$Srp(n) = Sd(n) - Snu(n), \text{ with } 0 \le n \le N-1$$

Figure 3D:
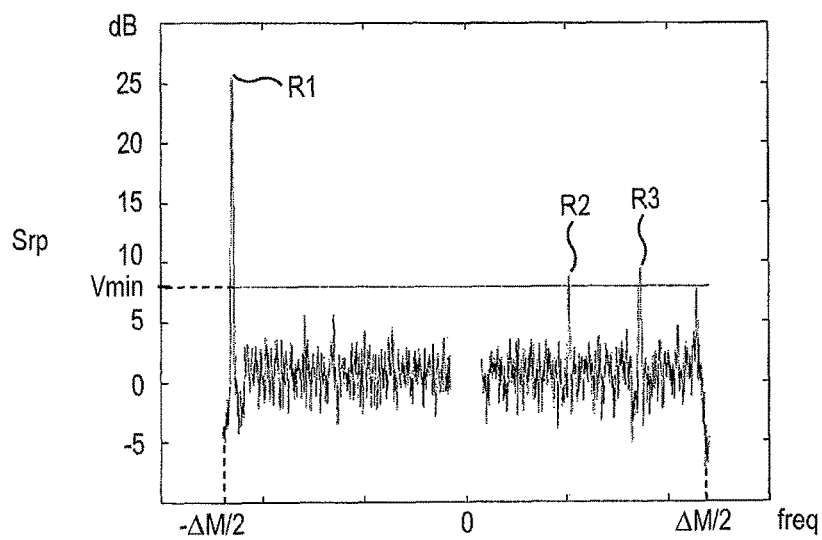

FIG. 3d shows a power ratio signal Srp obtained from the signals illustrated in FIGS. 3b and 3c.

Useful signal search method 50 then comprises act 57 of comparing power ratio signal Srp with a predefined threshold value Vmin. During this act, an elementary frequency for which said power ratio signal Srp has a local maximum value greater than said threshold value Vmin is considered as being the central frequency of a useful signal present in the general signal.

In the example illustrated in FIG. 3d (where the unwanted DC component has been ignored), the considered threshold value Vmin is substantially equal to 8 decibels (dB) and it can be observed that local maximum values R1, R2, and R3 are all three greater than said threshold value Vmin. Accordingly, these three local maximum values R1, R2, and R3 are considered as corresponding to useful signals, and the elementary frequencies for which these local maximum values have been obtained are considered as being the respective central frequencies of these useful signals.

In an embodiment, threshold value Vmin is previously determined as being a value of power ratio signal Srp above which the probability of decoding a detected useful signal with errors is lower than 5%, in an embodiment lower than 1%.

Such a selection of threshold value Vmin may be advantageous since facilitates optimizes the use of a calculation capacity of station 30, since said calculation capacity may be mainly used to process useful signals which are sufficiently powerful to be decoded.

More generally, the scope of the present disclosure is not limited to the embodiments described hereabove as non-limiting examples.

In particular, nothing precludes, according to other examples, having act 53 of conversion to the logarithmic scale executed at a different location in search method 50, for example, executed on the one hand on non-useful signal Snu and, on the other hand, on shifted signal Sd, just before act 56 of calculating power ratio signal Srp.

Further, search method 50, in the above-described example, comprises two processing branches which take signal S log as an input. These two processing branches could however take other signals as an input. According to a non-limiting example, the two branches may take frequency signal Sf as an input. In this case, the first branch (obtaining of non-useful signal Snu) may perform the averaging of act 52 and the filtering of act 54, and possibly a conversion to the logarithmic scale. The second branch then performs the averaging of act 52 and possibly a conversion to the logarithmic scale. In this example, each processing branch thus comprises the averaging of act 52. In the first branch, the averaging of act 52 and the filtering of act 54 may further be performed jointly with a single filter.

The invention claimed is:

1. A method of searching for a useful signal in a general signal received by a receiver station, said useful signal corresponding to a radioelectric signal having a predefined spectral width $\Delta B$ transmitted by a terminal in a multiplexing band having a spectral width greater than $\Delta B$, said general signal corresponding to all the radioelectric signals received in the multiplexing band, the method comprising:
generating, from the general signal received by the receiver station, a frequency signal representative of a power spectral density of the general signal sampled at elementary frequencies of the multiplexing band;
generating a non-useful signal, the generating the non-useful signal including filtering of the frequency signal using a filter to suppress from said frequency signal all or part of each signal having a spectral width equal to or smaller than $\Delta B$;
generating a power ratio signal, representative of a ratio, at each elementary frequency, of the frequency signal to the non-useful signal;
comparing the power ratio signal with a defined threshold value; and
identifying an elementary frequency for which said power ratio signal has a local maximum value greater than said threshold value as a central frequency of a useful signal present in the general signal.

2. The method of claim 1 wherein the elementary frequencies are separated by a sampling interval $\Delta b$ smaller than $\Delta B$, and said method comprises:
generating an averaged signal by averaging the frequency signal with a sliding window on the elementary frequencies, the sliding window having a width substantially equal to $\Delta B$;
filtering of the averaged signal to generate the non-useful signal; and
the generating the power ratio signal includes determining, at each elementary frequency, a ratio of the averaged signal to the non-useful signal.

3. The method of claim 2 wherein the sliding window is a rectangular window.

4. The method of claim 1, comprising selecting the defined threshold value to correspond to a value of a power ratio signal above which a probability to decode a useful signal with errors is lower than 5%.

5. The method of claim 1 wherein the elementary frequencies are separated by a sampling interval $\Delta b$ smaller than $\Delta B/4$.

6. A non-transitory computer-readable memory medium whose contents contain instructions which when executed by at least one processor of a receiver station cause the at least one processor of the receiver station to perform a method, the method comprising:
generating, from a general signal received by the receiver station, a frequency signal representative of a power spectral density of the general signal sampled at elementary frequencies of a multiplexing band, the multiplexing band having a bandwidth greater than a spectral width $\Delta B$ of signals transmitted in the multiplexing band;
generating a non-useful signal, the generating the non-useful signal including filtering of the frequency signal to suppress from said frequency signal all or part of each signal having a spectral width equal to or smaller than $\Delta B$;
generating a power ratio signal, representative of a ratio, at each elementary frequency, of the frequency signal to the non-useful signal;
comparing the power ratio signal with a defined threshold value; and
identifying an elementary frequency for which said power ratio signal has a local maximum value greater than said threshold value as a central frequency of a useful signal present in the general signal.

7. A receiver, comprising:
one or more memories;
one or more signal processors, wherein the one or more signal processors of the receiver, in operation:
generate, from a general signal received by the receiver, a frequency signal representative of a power spectral density of a general signal sampled at elementary frequencies of a multiplexing band, the multiplexing band having a bandwidth greater than a spectral width $\Delta B$ of signals transmitted in the multiplexing band;
generate a non-useful signal, the generating of the non-useful signal including filtering of the frequency signal to suppress from said frequency signal all or part of each signal having a spectral width equal to or smaller than $\Delta B$;
generate a power ratio signal, representative of a ratio, at each elementary frequency, of the frequency signal to the non-useful signal;
compare the power ratio signal with a defined threshold value; and
identify an elementary frequency for which said power ratio signal has a local maximum value greater than said threshold value as a central frequency of a useful signal present in the general signal.

8. A station of a digital telecommunications system, comprising:
an antenna system; and
signal processing circuitry of the station coupled to the antenna system, wherein the signal processing circuitry of the station, in operation:
generates, from a general signal received by the station, a frequency signal representative of a power spectral density of the general signal sampled at elementary frequencies of a multiplexing band, the multiplexing band having a bandwidth greater than a spectral width $\Delta B$ of signals transmitted in the multiplexing band;
generates a non-useful signal, the generating of the non-useful signal including filtering of the frequency signal to suppress from said frequency signal all or part of each signal having a spectral width equal to or smaller than $\Delta B$;
generates a power ratio signal, representative of a ratio, at each elementary frequency, of the frequency signal to the non-useful signal;
compares the power ratio signal with a defined threshold value; and
identifies an elementary frequency for which said power ratio signal has a local maximum value greater than said threshold value as a central frequency of a useful signal present in the general signal.

* * * * *